HYDRODYNAMIC BEARING SYSTEM PROVIDING AXIAL SELF-ADJUSTMENT

Filed May 6, 1968

INVENTOR.
EVERHARDUS A. MUIJDERMAN
BY
AGENT

HYDRODYNAMIC BEARING SYSTEM PROVIDING AXIAL SELF-ADJUSTMENT

INVENTOR.
EVERHARDUS A.MUIJDERMAN
BY
AGENT

United States Patent Office 3,511,546

Patented May 12, 1970

3,511,546

HYDRODYNAMIC BEARING SYSTEM PROVIDING AXIAL SELF-ADJUSTMENT

Everhardus Albertus Muijderman, Emmasingel, Eindhoven, Netherlands, assignor by mesne assignments, to U.S. Philips Corporation, New York, N.Y., a corporation of Delaware Filed May 6, 1968, Ser. No. 726,745

Claims priority, application Netherlands, May 11, 1967, 6706569

Int. Cl. F16c *17/10, 33/66*

U.S. Cl. 308—9 5 Claims

ABSTRACT OF THE DISCLOSURE

A hydrodynamic bearing system having an axial bearing at one end of a shaft and a spiral-groove fluid radial bearing at the opposite end, the radial bearing providing a thrust toward the axial bearing to maintain axial adjustment of the shaft.

This invention relates to a hydrodynamic bearing system in particular to an arrangement for supporting a rotatable shaft which provides accurate self-adjustment for the shaft during rotation.

Wherein bearing systems of the prior art use external devices for axial aligning a rotating shaft; this invention provides a simple bearing system in which the axial alignment or adjustment of the shaft is accurately controlled and not affected by this adjustment of the axial bearing, manufacturing tolerances nor temperature fluctuations.

The bearing system according to the invention comprises an axial bearing at one end of the shaft, the other end of the shaft remote from said axial bearing is accommodated in a cylindrical recess of a bearing bushing, which recess, together with the end of the shaft, forms a radial bearing. One of the relatively cooperating cylindrical surfaces of the shaft or of the recess is provided with shallow spiral grooves for transporting a lubricant. The grooves, upon rotation of the shaft, urge the lubricant towards the bottom of the recess in the bearing bush. The shaft has a length such, that when the axial bearing is clearance-free adjusted, the bottom of the recess and the end of the shaft are spaced apart from each other.

When the shaft is rotating, the lubricant in the radial bearing is pushed towards the bottom of the cylindrical recess in the bearing bushing so that between the bottom of said recess and the end of the shaft held in the recess a high hydrodynamic pressure is produced. This pressure urges the shaft towards the axial bearing so that a clearance-free axial adjustment of this bearing is constantly ensured. If, a rotor of an electric motor is secured to the shaft, this rotor will not be axially displaced during rotation, which is, of course, very advantageous and conventional external means for obtaining axial alignment or fixation of the shaft are not needed.

In one embodiment of the invention in which grease is used as a lubricant in the radial bearing, an annular chamber for storing grease is provided in the axis of the radial bearing, the cylindrical wall of the recess forming the boundary of said annular chamber and the transport grooves joining the side of the chamber facing the bottom of the recess, while on the other side of the chamber one of the relatively co-operating surfaces of the end of the shaft and of the recess is provided with a pattern of shallow spiral grooves operating as a seal for the grease.

The invention will be described more fully with reference to the embodiments shown in the drawing.

Figure 1:
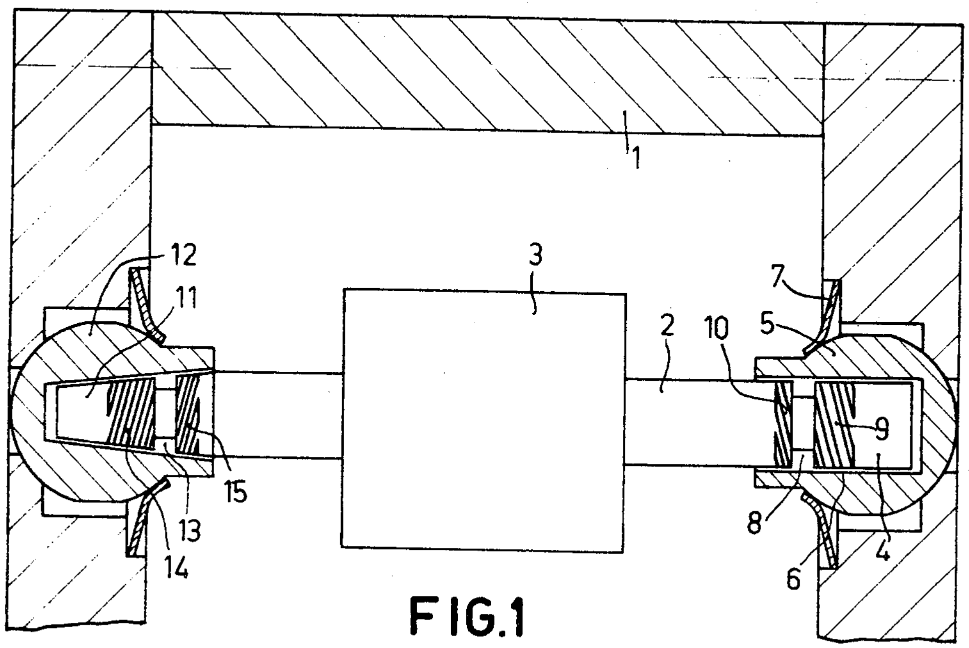
FIG. 1 shows an embodiment of the bearing system comprising a conical spiral-groove bearing as an axial bearing.

FIG. 1 shows the rigid frame 1 in which a shaft 2 is journalled. The shaft 2 is provided with a rotatable object 3, for example, the rotor of an electric motor. An end 4 of the shaft 2 is constructed in the form of part of a radial bearing. The associated spherical bushing 5 has a cylindrical recess 6 accommodating the end 4 of the shaft. The bushing 5 adjusts itself in known manner and is held in the frame 1 so as to be axially immovable by means of resilient means 7. The end 4 of the shaft is provided with an annular storing chamber 8 for grease. Moreover, spiral transport grooves 9 of small depth and sealing grooves 10 are provided.

The other end 11 of the shaft has a conical shape. A bearing bushing 12 has a conical bore accommodating the conical end 11 of the shaft 2. The bushing 12, like the bushing 5, is fixed in the frame so as to be self-adjusting. The conical end 11 is provided with a grease storing chamber 13, with shallow transport grooves 14 and with shallow sealing grooves 15. The end 11 of the shaft and the bushing 12 form a known conical spiral-groove bearing. Such a bearing operates hydrodynamical, has a high bearing capacity both in an axial and a radial sense and exhibits only very low frictional losses.

When the shaft 2 is rotating, the grease of the two storing chambers 8 and 13 is pushed by centrifugal force towards the wall of the recess in the bearing bushes. The sealing grooves 10 and 15 prevent the grease from leaking out. The transport grooves 9 and 14 conduct the grease towards the bottom of the recess in the bearing bushings 5 and 12. The bearing gaps are therefore constantly filled with grease, the bearings operate hydrodynamically and has a high bearing capacity and low frictional loss. The pushing effect of the transport grooves 9 will produce a pressure in the bushing 5 between the end 4 of the shaft and the bottom of the cylindrical recess 6 so that the shaft 2 is subjected to prestress to the left in FIG. 1. The conical spiral-groove bearing is capable of supporting heavy forces both in an axial and a radial sense, as is known. The value of the pressure between the bottom of the bushing 12 and the end 11 of the shaft depends in part upon the size of the bearing gap. The tapering end 11 of the shaft adjusts itself so that a state of equilibrium ensues between the local axial pressure and the prestress produced in the bearing formed by the bearing bush 5 and the end 4 of the shaft. Since the size of the bearing gap of the axial bearing and hence also the pressure rapidly increases or decreases, when the conical end 11 of the shaft is displaced, the shaft will practically always occupy the same axial position; the deviation amounts to merely a few micrometres. The shaft 2 has such a length that ample clearance is provided between the end 4 of the shaft and the bottom of the recess in the bearing box 5. This clearance is preferably greater than 0.1 mm. A variation of length of the shaft due to temperature changes will not affect the bearing. Moreover, the accuracy in manufacture need not meet severe requirements. Owing to the prestress exerted by the cylindrical radial bearing on the shaft a correct axial positioning of the shaft will constantly be ensured.

In the embodiment of FIG. 1 the grooves 9, 10, 14, 15 are provided in the shaft. However, with the same effect they may be provided in the recess of the bearing bushings 5 and 12. It is very advantageous to lubricate the bearings with grease, since leakage will then not occur and subsequent lubrication, even after a long time, is not required. If desired, however, a different lubricant may be used, for example, oil.

Figure 2:
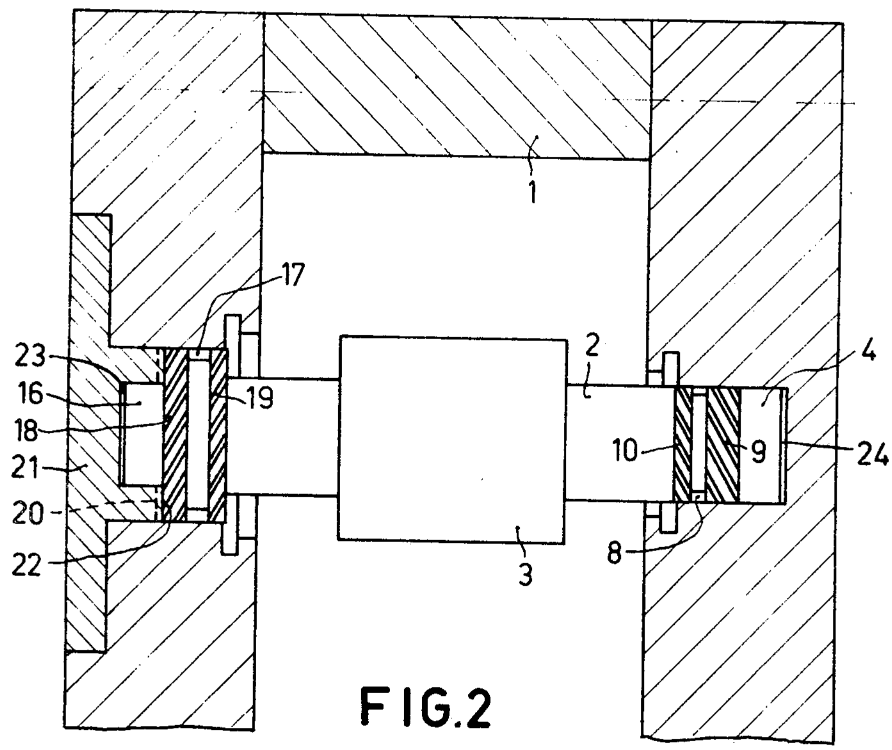
FIG. 2 shows a bearing system in which the axial bearing is a flat spiral-groove bearing.

FIG. 2 shows an embodiment of the bearing system in which the conical bearing of FIG. 1 is replaced by a spiral groove bearing formed by the combination of a radial and and axial bearing part. The end of the shaft 16 has a grease storing chamber 17, joined by shallow transport grooves 18 and sealing grooves 19. The axial forces exerted on the shaft 2 are met by a known flat spiral-groove bearing, one part of which is formed by spiral grooves 20 in a lid 21, shown schematically, whereas the other part is formed by a shoulder 22 on the shaft.

The operation of this bearing system is basically the same as that of the bearing system of FIG. 1. The geometrical shape of the bearings has to be designed so that the pressure in the space 23 between the end of the shaft 16 and the bottom of the lid 21 is lower than the pressure in the space 24 of the other bearing. Then the bearing combination 20–22 will constantly determine the axial adjustment of the shaft 2. This can be achieved in a simple manner by a correct choice of, for example, the length or the depth of the transport grooves 9 and 18.

Figure 3:
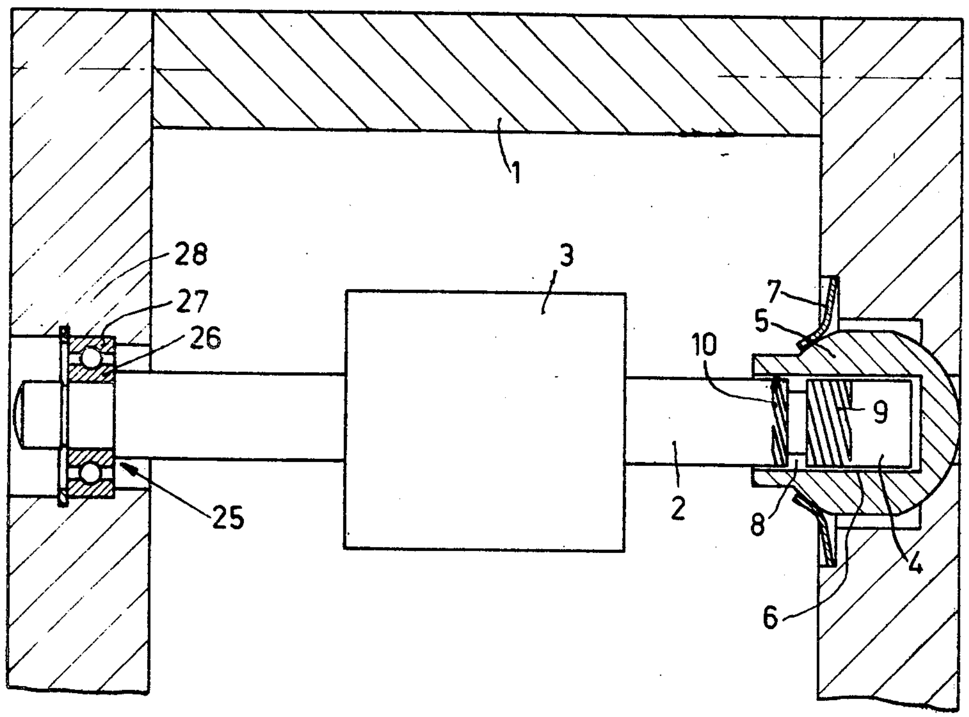
FIG. 3 shows a bearing system for a passing shaft, the axial bearing being a ball-bearing.

FIG. 3 shows a further embodiment of a bearing system for a shaft, in which the axial forces exerted on the shaft are not met by a spiral-groove bearing, but by a deep-groove ball-bearing. The inner ring or race 26 of the ball-bearing is rigidly secured to the shaft 2. The outer ring or race 27 is held by means of a spring ring 28 in a recess of the frame. It is known that a satisfactory operation of the ball-bearing does not allow axial clearance between the outer ring 27, the balls and the inner ring 26. In the embodiment shown no particular precautions are required for this purpose; the axial clearance is obtained automatically by the axial prestress exerted by the groove bearing on the shaft 2.

What is claimed is:

1. A hydrodynamic bearing arrangement for a shaft comprising a frame for rotatably supporting both ends of the shaft, a closed end recess within said frame for accommodating one end of the shaft, the surfaces of said recess and the shaft being in a confronting relationship, said end of the shaft being spaced from the closed end of the recess; first bearing means at said end of the shaft for providing radial and axial support for the shaft, said bearing means including a spiral groove pattern in at least one of the confronting surfaces of the recess and shaft, an annular groove in the shaft for storage of a lubricant the spiral groove pattern being adapted, upon rotation of the shaft, to urge a lubricant toward the closed end of the recess and to provide an axially outward thrust to the shaft and a resultant clearance between said end of the shaft and the closed end of the recess and an additional recess within said frame for accommodating a second bearing means, said second bearing means being at the other end of the shaft for providing radial support and for absorbing said axial thrust.

2. A hydrodynamic bearing arrangement as claimed in claim 1 wherein the first bearing means further comprises, a spiral groove pattern defined in the periphery of said shaft positioned between said annular groove and said end of the shaft, for transporting the lubricant toward the closed end of the recess, and an additional spiral groove pattern in the periphery of said shaft positioned between the annular groove and the open end of the recess for preventing the escape of lubricant from within the recess.

3. A hydrodynamic bearing arrangement as claimed in claim 2 comprising two spherical bearing bushings, resilient means for adjustably securing said bearing bushings to the frame, a cylindrical recess defined in one of said bearing bushings for cooperation with said first bearing means, a conical recess defined in the other of said bearing bushings for cooperation with said second bearing means.

4. A hydrodynamic bearing arrangement as claimed in claim 2 wherein said second bearing means comprises an inwardly directed shoulder portion formed in the end of the shaft, an annular lid member within said additional recess in abutting relationship with the shoulder and a spiral groove pattern formed in said lid for absorbing said axial thrust.

5. A hydrodynamic bearing arrangement as claimed in claim 2 wherein said second bearing means comprises an inner race affixed to the end of said shaft, an outer race spaced therefrom, a spring ring for resiliently attaching the outer race within said additional recess, and ball bearings positioned between the two races.

References Cited

UNITED STATES PATENTS

| | | | |
|---|---|---|---|
| 3,154,353 | 10/1964 | Haring | 308—9 |
| 3,453,032 | 7/1969 | Oberle | 308—9 |
| 1,478,338 | 12/1923 | Isom | 308—187.1 X |
| 1,508,085 | 9/1924 | Cooper | 308—187.1 |
| 1,904,392 | 4/1933 | Stintzing | 308—36.3 |
| 2,008,527 | 7/1935 | Warren | 308—36.3 |
| 2,266,107 | 12/1941 | Waterfill | 308—36.3 X |
| 2,325,283 | 7/1943 | Swearingen | 308—36.3 |
| 2,390,332 | 12/1945 | Schmidt | 308—36.3 |
| 3,238,000 | 3/1966 | Muijderman | 308—240 |

FOREIGN PATENTS

| | | |
|---|---|---|
| 975,076 | 11/1964 | Great Britain. |

MARTIN P. SCHWADRON, Primary Examiner

L. L. JOHNSON, Assistant Examiner

U.S. Cl. X.R.

308—36.3, 121, 240

UNITED STATES PATENT OFFICE

CERTIFICATE OF CORRECTION

Patent No. 3,511,546 Dated May 12, 1970

Inventor(s) EVERHARDUS ALBERTUS MUIJDERMAN ET AL

It is certified that error appears in the above-identified patent and that said Letters Patent are hereby corrected as shown below:

Col. 1, lines 31 and 32, delete "this adjustment of the axial bearing,"

Signed and sealed this 3rd day of August 1971.

(SEAL)
Attest:

EDWARD M.FLETCHER,JR.
Attesting Officer

WILLIAM E. SCHUYLER, JR.
Commissioner of Patents